(12) United States Patent
Gonzalez-Aguirre

(10) Patent No.: US 12,198,292 B2
(45) Date of Patent: Jan. 14, 2025

(54) WRITING/DRAWING-TO-DIGITAL ASSET EXTRACTOR

(71) Applicant: Intel Corporation, Santa Clara, CA (US)

(72) Inventor: David I. Gonzalez-Aguirre, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 17/133,346

(22) Filed: Dec. 23, 2020

(65) Prior Publication Data

US 2021/0304426 A1   Sep. 30, 2021

(51) Int. Cl.
| | |
|---|---|
| *G06T 7/13* | (2017.01) |
| *G06F 18/25* | (2023.01) |
| *G06T 3/40* | (2006.01) |
| *G06T 3/4007* | (2024.01) |
| *G06T 3/60* | (2024.01) |
| *G06T 5/92* | (2024.01) |
| *G06T 7/194* | (2017.01) |
| *G06T 7/35* | (2017.01) |
| *G06V 10/141* | (2022.01) |
| *G06V 10/44* | (2022.01) |
| *G06V 10/75* | (2022.01) |
| *G06V 10/77* | (2022.01) |
| *G06V 20/00* | (2022.01) |

(52) U.S. Cl.
CPC ............... *G06T 3/40* (2013.01); *G06F 18/25* (2023.01); *G06T 3/4007* (2013.01); *G06T 3/60* (2013.01); *G06T 5/92* (2024.01); *G06T 7/13* (2017.01); *G06T 7/194* (2017.01); *G06T 7/35* (2017.01); *G06V 10/141* (2022.01); *G06V 10/44* (2022.01); *G06V 10/751* (2022.01); *G06V 10/7715* (2022.01); *G06V 20/00* (2022.01); *G06T 2207/20164* (2013.01)

(58) Field of Classification Search
CPC ............. G06T 7/13; G06T 2207/20164; G06T 2207/20132; G06T 3/40; G06T 7/12; G06V 10/44; G06V 10/7715; G06V 20/00
See application file for complete search history.

(56) References Cited

U.S. PATENT DOCUMENTS

| | | | | |
|---|---|---|---|---|
| 7,801,355 | B2* | 9/2010 | Arazaki | G06T 3/4015 |
| | | | | 348/237 |
| 10,127,468 | B1* | 11/2018 | Lemay | H04N 1/00689 |
| 10,699,413 | B1* | 6/2020 | Ansari | G06T 7/11 |

(Continued)

OTHER PUBLICATIONS

European Search Report for European Patent Application No. 21198755.7, mailed Mar. 25, 2022, 12 pages.

(Continued)

*Primary Examiner* — Ian L Lemieux
*Assistant Examiner* — Sebastian-Sy Vuchi Ngo
(74) *Attorney, Agent, or Firm* — Jordan IP Law, LLC

(57) ABSTRACT

A system, apparatus, method and a computer readable storage medium for extracting an asset. The method captures a scene having a two-dimensional (2D) boundary in a field of view. The scene is analyzed to detect visual content on the 2D boundary. The visual content is extracted without capturing a visual field beyond the 2D boundary. The visual content is sent over a network interface for remote sharing.

13 Claims, 11 Drawing Sheets

(56) References Cited

U.S. PATENT DOCUMENTS

| | | | |
|---|---|---|---|
| 11,195,331 B2* | 12/2021 | Lee | G06T 7/13 |
| 2018/0024974 A1* | 1/2018 | Welinder | G06V 30/413 |
| | | | 715/229 |
| 2022/0091809 A1* | 3/2022 | Nagano | G06F 3/04845 |

OTHER PUBLICATIONS

L. He et al. "Real Time Whiteboard Capture and Processing Using a Video Camera for Remote Collaboration", retrieved from <microsoft.com/en-us/research/wp-content/uploads/2016/02/tr-2004-91.pdf>, IEEE Transactions on Multimedia, vol. 9, No. 2, Jan. 2007, pp. 198-206.

T. Mertens et al. "Exposure Fusion", retrieved from <web.stanford.edu/class/cs231m/project-1/exposure-fusion.pdf>, 15th Pacific Conference on Computer Graphics and Applications, pp. 382-390.

H. Kim et al. "Region-Based Shape Descriptor Invariant to Rotation, Scale and Translation", Signal Processing. Image Communication, Elsevier Science Publishers, Amsterdam, NL, Sep. 1, 2000, pp. 87-93.

G. F Mclean. "Geometric Correction of Digitized Art", CVGIP Graphical Models and Image Processing, Academic Press, Duluth, MA, US, Mar. 1, 1996, pp. 142-154.

* cited by examiner

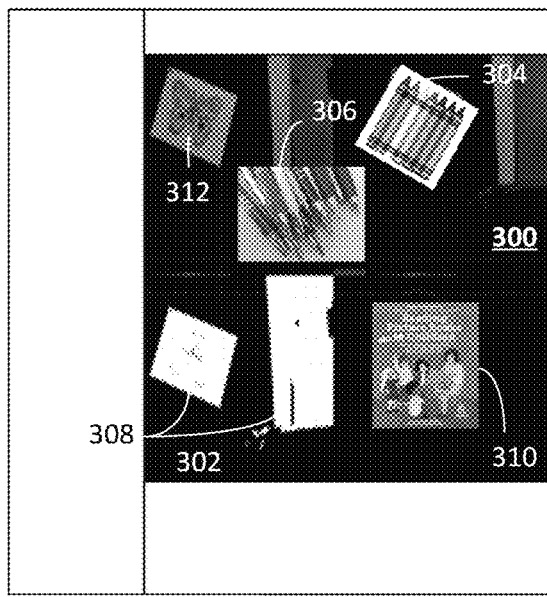
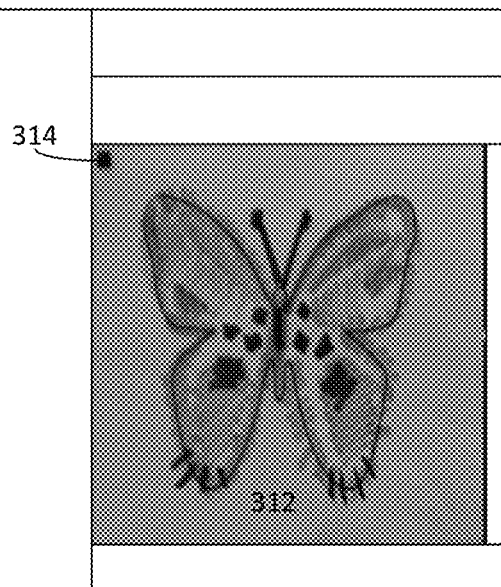
FIG. 3A  FIG. 3B

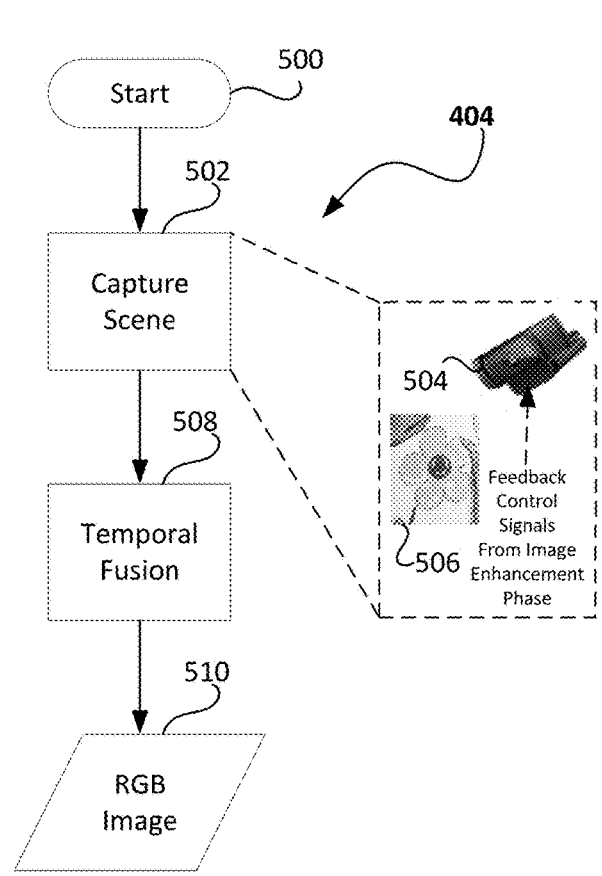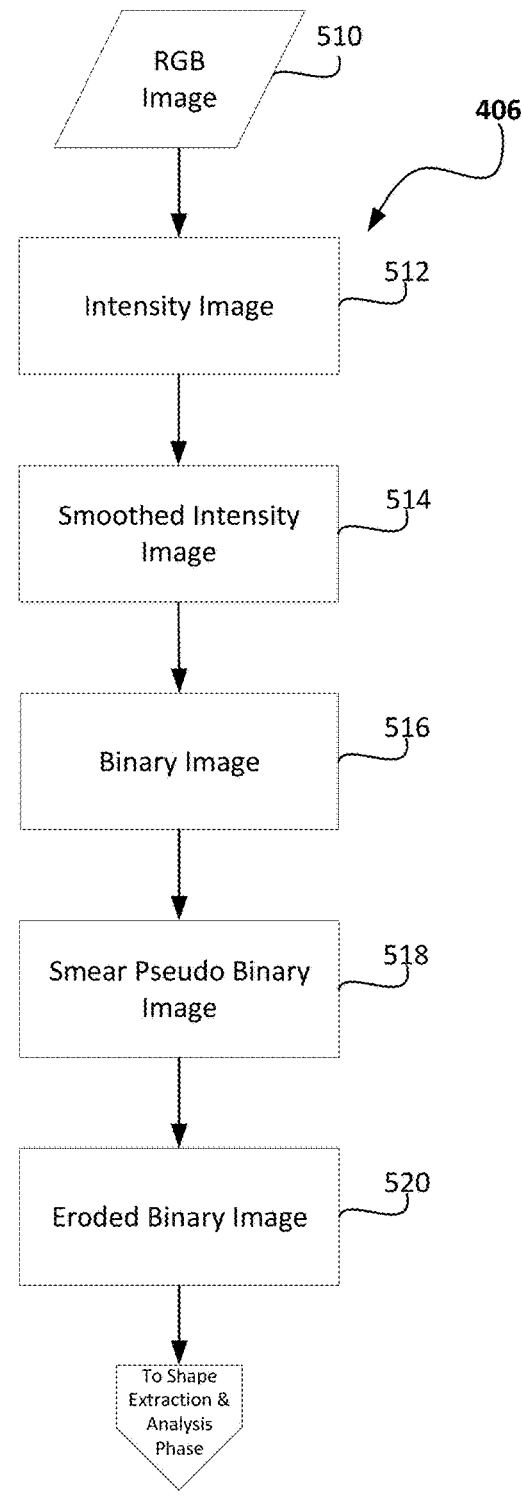
FIG. 5A
FIG. 5B

WRITING/DRAWING-TO-DIGITAL ASSET EXTRACTOR

TECHNICAL FIELD

Embodiments generally relate to computer vision and scene analysis. More particularly, embodiments relate to a writing/drawing-to-digital asset extractor for privacy protection.

BACKGROUND

There is a plethora of applications in use today that may be used for remote education, work, collaboration and entertainment, such as, for example, Zoom, developed by Zoom Video Communications, Google Meet, developed by Google, Skype, developed by Microsoft Corporation, WebEx, developed by Cisco Systems and Microsoft Teams, developed by Microsoft Corporation. Such applications are great for multi-person videoconferencing. What they do not provide is the ability to analyze a scene for privacy protection.

BRIEF DESCRIPTION OF THE DRAWINGS

The various advantages of the embodiments will become apparent to one skilled in the art by reading the following specification and appended claims, and by referencing the following drawings, in which:

FIG. 3A is a diagram illustrating an example workspace that includes a user's work product to be captured by a writing/drawing-to-digital asset extractor system according to an embodiment;

FIG. 3B is a diagram illustrating the extraction of the user's work product from the workspace of FIG. 3A by the writing/drawing-to-digital asset extractor system according to an embodiment;

FIG. 5A is a flow diagram of an example method of a signal acquisition phase according to an embodiment;

FIG. 5B is a flow diagram of an example method of an image processing phase according to an embodiment;

Figure 1:
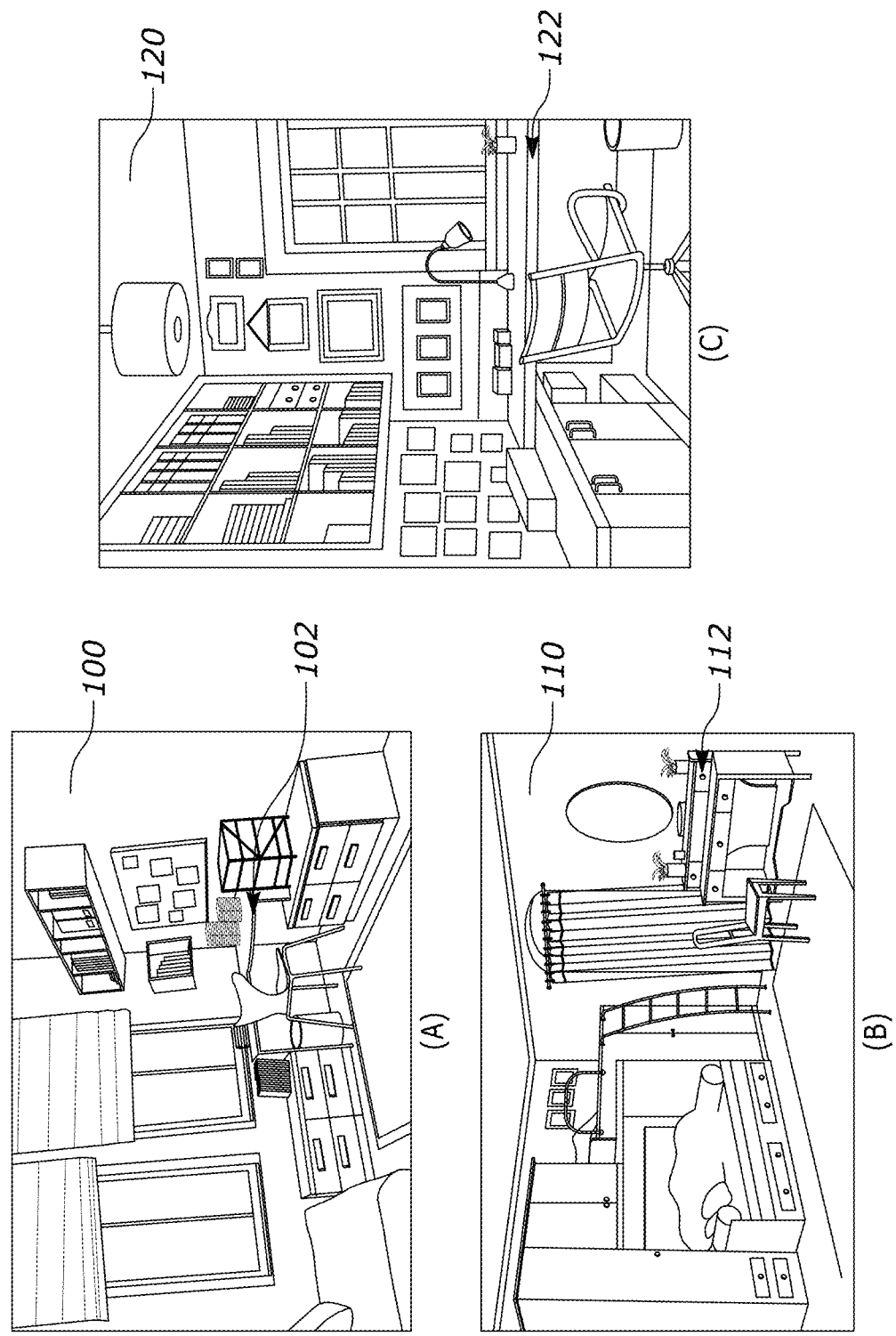
FIG. 1A is a picture of an example of an older child's bedroom.
FIG. 1B is a picture of an example of a young child's bedroom.
FIG. 1C is a picture of an example of a home office.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology to provide a writing/drawing-to-digital asset extractor (also referred to as an extractor) system for capturing 2-D physical sketches, text, drawings, and other types of texture assets on a surface while interactively being modified using a single off-the-shelf RGB (Red Green Blue) camera and sharing the texture assets over networks and social media. The extractor system ensures 100% privacy of the surrounding areas of the user's workspace by extracting the asset in a manner completely invariant of the 3-D position, 3-D orientation of the asset on the surface or the camera. The extractor system operates without any calibration overhead or special set up for optimal deployment in real world settings. The extractor system compensates for radial and projective distortion and lighting limitations such as brightness-contrast and intensity, all while preserving color consistency such as white balance and image temperature. The system also ensures that the assets do not contain any privacy sensitive material from the user's home or private space while sharing the visual content of the asset for virtual applications such as, for example, education, work, collaboration, entertainment, and other remote smart space applications.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

There has been an unprecedented growth in remote education, remote collaboration, remote entertainment and working remotely. Challenges in connecting the physical, tangible world with the digital continue to provide technological opportunities. Remote learning for children, including toddlers, limits the ability for children and teachers to share common visual space of the physical assets or work product while also reducing the ability to visualize the process of learning and motor skills while children are writing/drawing and interacting with objects. Remote collaboration for the telecommuter also has its pitfalls, especially for the new employee with little experience. They, too, may have to experience on the job training remotely. The need to feel comfortable communicating with managers, sponsors and/or mentors that are trustworthy is also important for the telecommuter.

Privacy is important for children as well as adults. Being able to exclude others from viewing one's surroundings during remote education, collaboration and/or entertainment is needed. For example, FIGS. 1A and 1B show a young child's bedroom 100 and an older child's bedroom 110, respectively. In each bedroom (100 and 110), the child has a desk (102 and 112) that they may use for their workspace during a remote session and a plethora of other items, such as, for example, beds, bookcases, closets, shelves, toys, etc. are in the bedrooms. The child may not want any of the other participants of the remote session to view any of the other items in their bedroom. In another example, FIG. 1C depicts a home office 120 of a telecommuter. The home office 120 also includes a desk 122 that the telecommuter may use for their workspace during a remote session and a plethora of other items, such as, for example, shelves, books, pictures, storage bins, etc., are also in the home office. The telecommuter also may want to prevent the other participants from viewing any of the other items in the home office.

Figure 2:
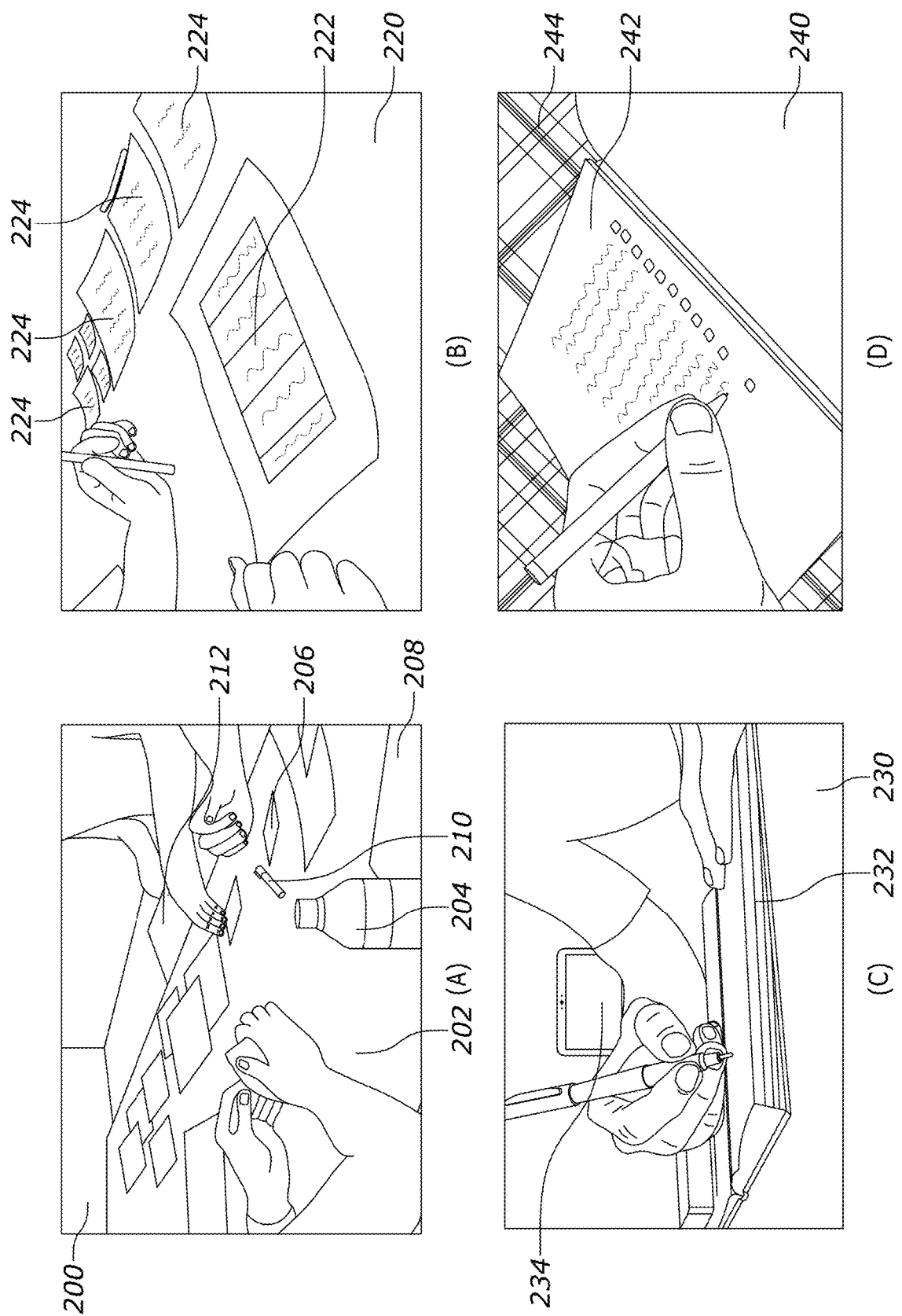
FIGS. 2A, 2B, 2C and 2D illustrate different scenarios of example workspaces.

Not only are people apprehensive about other participants in a remote session being able to see their surroundings, they also do not want them to see their entire workspace. FIGS. 2A, 2B, 2C and 2D depict different scenarios for workspaces. In FIG. 2A, workspace 200 shows multiple students working at one table 202. As can be seen, the workspace includes items, such as, for example, a bottle of water 204, pieces of notepads 206, other students' works 208 and student supplies 210, that an individual student may not want displayed when his work 212 is being remotely showcased. In FIG. 2B, workspace 220 shows a student reviewing her work 222 on an 8.5×11 sheet of paper. Above the 8.5×11 sheet of paper are smaller pieces of paper 224 lined in a row. The student may not want the row of smaller pieces of paper 224 displayed when her work 222 is being remotely showcased. In FIG. 2C, workspace 230 shows a student writing in his notebook 232. FIG. 2C also shows the student's computer screen 234 displaying information. The student may not want the computer screen to be displayed when his notebook 232 is being remotely showcased. A workspace 240 in FIG. 2D illustrates a telecommuter preparing a work product 242 that is surrounded by a checkered piece of cloth 244. In this instance, the telecommuter may not want the checkered cloth 224 displayed when his work product 242 is being remotely showcased.

Embodiments of the extractor system solve the privacy problem by only displaying an individual's work product without displaying any other information on the workspace or within the room. FIG. 3A is a diagram illustrating an example workspace 300 that includes a user's work product to be captured by a writing/drawing-to-digital asset extractor system according to an embodiment. The workspace 300 includes a desk 302 that the user uses as his workspace. There are several items on the desk 302, such as, crayons 304, pens 306, paper 308, a book 310, and a drawing 312. The drawing 312 represents the user's work product. Note that the drawing 312 is slanted on the desk 302, therefore, the extractor system will need to display the drawing in the correct orientation.

The writing/drawing-to-digital asset extractor system is an end-to-end solution for the digitalization and extraction of 2-D assets on a workspace in a fast and cost-effective manner. The system analyzes the scene in order to detect and extract the visual content on a surface bounded by a two-dimensional (2-D) boundary, such as, for example, a sheet of paper, a canvas or any other 2-D boundary for remote sharing or local usage. The shared content is high quality such as, for example, full high definition (HD) and 4K, high peak signal-to-noise ratio (PSNR) and accurate color consistency. The shared content does not go beyond the 2-D boundary. In other words, the system does not capture visual content beyond the target working space, thereby providing 100% privacy protection to its users.

FIG. 3B is a diagram illustrating the extraction of the user's work product 312 from the workspace 300 of FIG. 3A by the writing/drawing-to-digital asset extractor system according to an embodiment. As shown in FIG. 3B, the extractor system captured the user's work product 312 of FIG. 3A without capturing any visual content beyond the user's work product 312. The drawing 312 was extracted in a manner completely invariant of the 3D position, 3D orientation of the paper or the camera. Even though the drawing 312 is placed on the desk 302 at an angle in FIG. 3A, the extractor system was able to correct the orientation using a square 314 found in the upper left hand corner of the drawing 312. The square 314 is a marker used to identify the orientation of the drawing.

Figure 4:
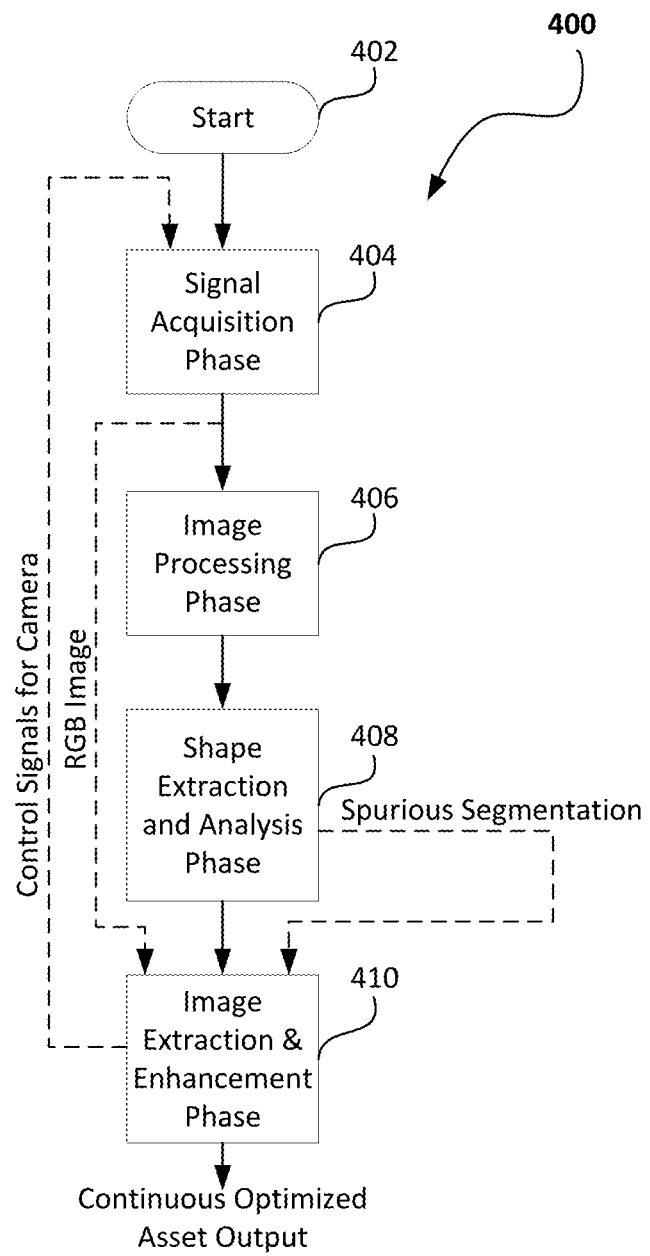
FIG. 4 is a flow diagram illustrating each phase of an extraction process to extract a user's work product from a workspace according to an embodiment.

FIG. 4 is a flow diagram illustrating each phase of an extraction process to extract a user's work product from a workspace according to an embodiment. The method 400 may generally be implemented in a system such as, for example, the writing/drawing-to-digital asset extractor system 600 described below with reference to FIG. 6. More particularly, the method 400 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 402, where the process immediately proceeds to block 404. In block 404, a signal acquisition phase is performed. During the signal acquisition phase 404, a camera captures a scene from a sheet of paper, a canvas or 2-D boundary located within a user's workspace. The scene is representative of a work product created by a user on the surface of the user's workspace. The output of the signal acquisition phase 404 is an RGB image. A more detailed description of the signal acquisition phase 404 is described below with reference to FIG. 5A. The process then proceeds to block 406.

In block 406, an image processing phase is performed. The image processing phase 406 receives the RGB image from the signal acquisition phase 404 and transforms the RGB image into a binary image of black and white pixels that will differentiate segments that belong to the foreground from segments that belong to the background. During the image processing phase 406, the boundary of the image (i.e., work product) is determined, and components not fully contained in the image are removed to ensure that the targeted scene or object (i.e., the user's work product) is fully in the field of view. This helps to preserve the user's privacy by eliminating all objects outside of the border of the work product. A more detailed description of the image processing phase 406 is described below with reference to FIG. 5B. The process then proceeds to block 408.

In block 408, a shape extraction and analysis phase is performed. The shape extraction and analysis phase 408 receives as input the binary image from the image processing phase 406 and produces a geometric boundary that is an oriented invariant of the position and orientation of the camera and the 2-D boundary in the 3-D world. During the shape extraction and analysis phase 408, corner points are analyzed to determine the shape of the workspace. An orientation cue is also determined by finding a base corner of the shape. A more detailed description of the shape extraction and analysis phase 408 is described below with reference to FIG. 5C. The process then proceeds to block 410.

In block 410, an image extraction and enhancement phase is performed. During the image extraction and enhancement phase 410, the image content is optimally extracted using image unwrapping and interpolation. The image is enhanced using color correction methods based on the color of the orientation cue.

FIG. 5A is a flow diagram of an example method of the signal acquisition phase 404 according to an embodiment. The process begins in block 500, where it immediately proceeds to block 502. In block 502, a scene is captured by a camera, such as, for example, scene 506 captured by camera 504. In embodiments, the scene may be a user's work product located on the user's workspace (e.g., a desk, a table, etc.). The user's work product may be created on a canvas, a sheet of paper, a piece of cardboard, a poster, or any other 2D boundary material having four corners that the user may utilize when creating their work product. In one embodiment, the material having four corners may have a rectangular shape. The camera, when capturing the scene, also captures the material on which the scene is created in the field of view with a color difference with respect to the background, noticeable enough to be able to detect the edges (e.g., borders) of the material. The camera captures multiple images in quick succession. In other words, the camera operates in a fast burst mode to capture multiple images in sequence. In one embodiment, 10 to 15 exposures may be taken in quick succession. The process then proceeds to block 508.

In block 508, to reduce the noise and lighting effects as well as implement implicit motion detection over the scene and obtain a higher signal-to-noise (SNR) ratio, temporal fusion takes place. The 10 to 15 exposures of the same scene (or image) are used to compute the mean and standard deviation per color channel in each pixel of the image, and fusing them into one image. This process detects rapid variation on the field of view which may produce erroneous frames or capture zone that may be privacy sensitive. For example, when the user has an object on the workspace, like for instance, a bottle of water, or for a split second (i.e., 10-200 msecs.) places their hand, arm or elbow over the work product, there may be a shadow affect in a few of the 10 to 15 exposures, which are referred to as outliers. As a result of fusing the exposures to gather, in terms of the intensity in each of the pixels, the effects of the outliers may be removed. Statistics per channel, such as, for example, intensity variation range, mean, standard deviation, dispersion coefficient, etc., are kept. The process then proceeds to block 510.

In block 510, the output is a noise-reduced and temporally stable, fused RGB image. The fused RGB image is then passed to the image processing phase 406 as well as the Image Extraction and Enhancement Phase 410.

FIG. 5B is a flow diagram of an example method of the image processing phase 406 according to an embodiment. The image processing phase 406 begins in block 512 when the RGB image is received. In block 512, the RGB image is desaturated using Hue Saturation Lightness (HSL) decomposition to mitigate chromatic aberration due to lenses distortion. Desaturation removes the colors from the image. In other words, the image is now a black and white image. In embodiments, the RGB image is preserved and the desaturation is performed on a copy of the RGB image. The desaturation of the RGB image results in a 2D intensity image that is easier to use for detection purposes. HSL is well known to those skilled in the relevant art(s). The process then proceeds to block 514.

Extraction of edges and connected components determining the boundary of the image are sensitive to noise, particularly at the edges or in cases where the drawings or color spots are covering significant parts of the border. In block 514, an edge preserving smoothing technique is performed on the 2D intensity image to make the borders and/or edges between the background and the foreground more subtle so that when segmenting or partitioning foreground from background, noise affects around the edges do not create irregular borders. The edge preserving smoothing is implemented using a bi-lateral filter to filter the 2D intensity image. This process results in a smoothed intensity image that essentially blurs the 2-D intensity image to obtain what is called an edge preserving effect. Using the 2D intensity image requires one spatial and one range sigma with rather small kernel sizes. In embodiments, the computational burden of this process is more manageable when parallel processing is used. The process then proceeds to block 516.

In block 516, binarization of the smoothed intensity image is accomplished using contrast adaptive thresholding in order to extract geometric boundaries from the smoothed intensity image. With contrast adaptive thresholding, for every pixel, the neighboring pixels around it are analyzed. It is then determined whether there is a center pixel in that region that is above or below the mean. If the center pixel is above the mean, it is classified to be a white pixel. If the center pixel is below the mean, it is classified as a zero or black pixel. This results in a binary image. The process then proceeds to block 518.

In block 518, another blurring process is performed. A standard Gaussian convolution blur is performed on the binary image. In this phase, a parameter free erosion of the binary image is implemented by a smear (i.e., directional smoothing) followed by direct thresholding. Erroneous connections between background and foreground are removed from the binary image to make the lines along the border more robust. This process results in a smear pseudo-binary image. The process then proceeds to block 520.

In block 520, directional diffusion is performed to denoise the smear pseudo-binary image of what appears to be speckles along the inside edge of the image, but may actually be noise. This process removes connected components not fully contained in the image to ensure that the image is fully in the field of view to preserve signal cropping for privacy purposes. It also ensures faster performance of the next two phases. This process results in an eroded binary image that is sent to the shape extraction and analysis phase 408.

Figure 5C:
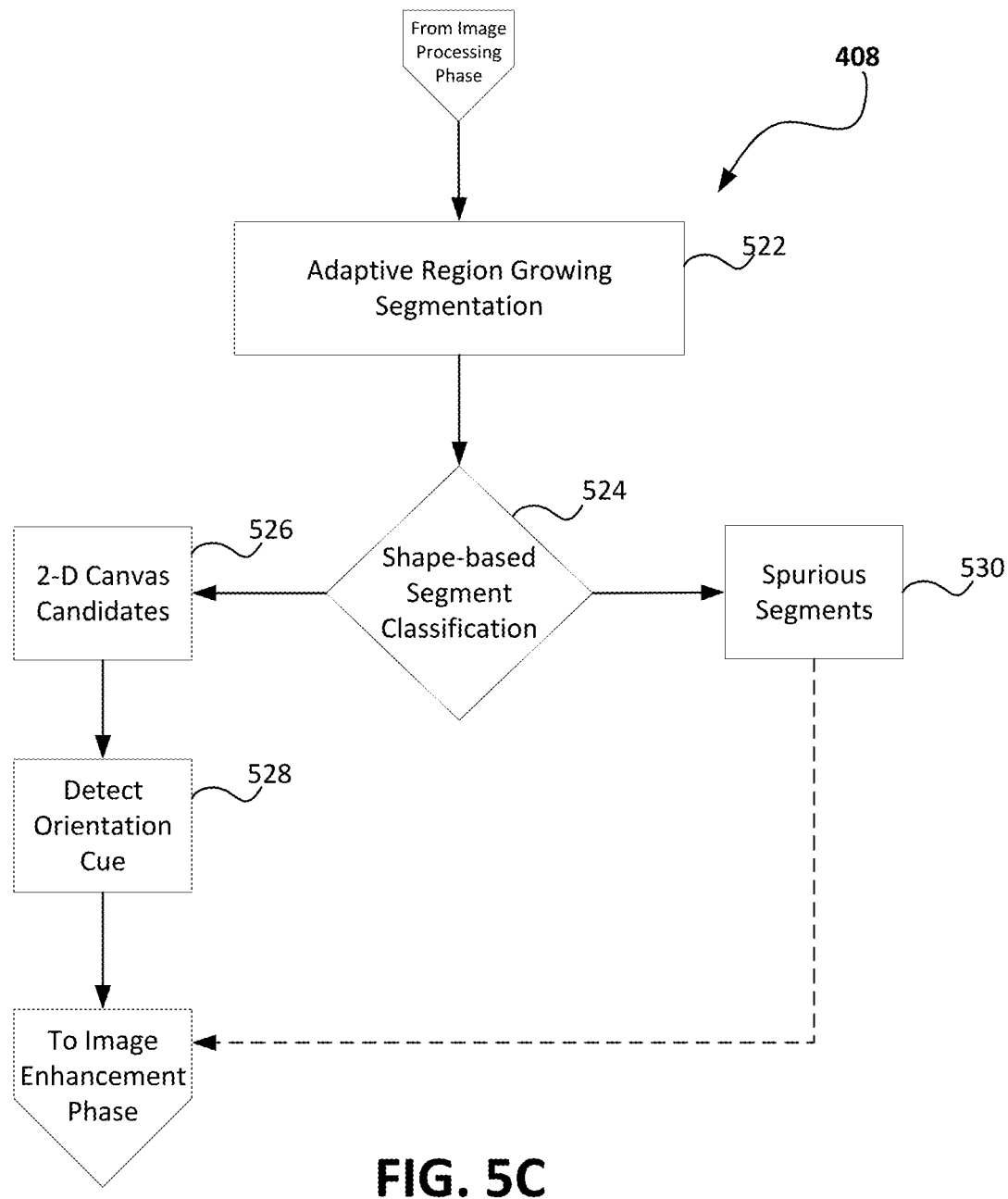
FIG. 5C is a flow diagram of an example method of a shape extraction and analysis phase according to an embodiment.

FIG. 5C is a flow diagram of an example method of the shape extraction and analysis phase 408 according to an embodiment. The shape extraction and analysis phase 408 begins in block 522 when the eroded binary image is received. In block 522, adaptive region growing segmentation with simultaneous covariance computation is performed on the binary image fully contained in the 2-D boundary. This process may begin at any point within the binary image. The beginning point is referred to as a seed or starting point. Region growing occurs as pixels adjacent to the starting point are examined and if they have the same intensity value as the starting point then they are connected to the starting point in the form of a list and then pixels surrounding those added to the list are also examined. The goal is to classify similar pixels into regions. For example, if the starting pixel is black and the neighboring pixels are black, the neighboring pixels are added to the list of the starting pixel and then the neighbors of the neighboring pixels are examined. When the neighbors of the neighboring pixels are no longer similar, a new starting point is established and the process continues until all of the pixels are placed into blocks. This process results in connected linked lists of pixels of the target object while also shaping up an eigenvector and eigenvalues that describe the basic rotation invariant geometric structure of the shape as shown in FIG. 5E, which is discussed below. The process then proceeds to decision block 524.

In decision block 524, shape-based segment classification is performed for each block. For example, if a block is white, it may be classified as a component of the foreground of the picture and if a block is black, it may be classified as a component of the background of the picture. In another example, the block has to be bigger than a certain amount of pixels because if it is a very small block with a length versus width ratio below a certain threshold, there may not be a need to analyze the small block. In this instance, the small blocks may be classified as spurious segments (shown in FIG. 5E) that are passed to block 530 while blocks based on elongation, bounding box size, contour versus inter-area ratio and other stable attributes of the blocks are classified as 2-D canvas candidates (shown in FIG. 5E) and passed to block 526 for further processing. Although not used in the shape extraction and analysis phase 408, the spurious segments are collected and kept for use in the image extraction and enhancement phase 410.

Also, a block may not be connected to the border of the image. In other words, the block must be fully contained within the image field-of-view or the camera field-of-view to ensure that the picture will be considered. In this instance, the shape extraction and analysis phase 408 will discard the current image if the block is connected to the border of the image and proceed to process the next image.

FIG. 5E is a diagram 550 illustrating target canvas detection, segmentation and orientation detection according to an embodiment. FIG. 5E shows the target canvas detection 552 as a rectangular shape representing the border of the image. Segmentation detection illustrates spurious segments 554 shown as having a small amount of pixels in tiny blocks of basically undefined shapes and 2-D canvas candidates 556 shown as having a large amount of pixels in bigger blocks with more pronounced shapes.

Returning to block 524 in FIG. 5C, in one embodiment, a statistical or neural classifier may be used to classify the segments into 2-D canvas candidates 556 for further validation from those which are spurious segments 554. Classifier training may be based on elongation, bounding box size, contour versus inter-area ratio and other stable attributes of a segment.

Once shape-based segment classification has been completed, the process proceeds to block 526. In block 526, by further analyzing the corner saliency points of the 2-D canvas candidates 556, it is possible to determine if the shape is a quadrilateral. Returning to FIG. 5E, this is accomplished by finding the salient corners 558 in the Eigen box or Eigen axes (Principal Eigen Axes (+I, −I) and (+J, −J) 560 and 562) distribution of the pixels for each segment. When four peaks are distributed within a limited angular range, this is usually representative of a quadrilateral of free ratio in the image. Returning to block 526 in FIG. 5C, the process then proceeds to block 528.

In block 528, in order to place the image in the correct orientation position, embodiments may detect an orientation cue. As shown in FIG. 5E, the orientation cue 564 indicates the upper left corner of the image and is shown as a black square. In other embodiments, the orientation queue 564 may be distinguishable using a different shape and/or color. Since there are only four possible orientations of the canvas, the orientation queue 564 must be located near a corner of the canvas. Using the center of mass 566, the orientation queue 564 may be located on a direct line 568 from a corner 558 of the canvas to the center of mass 566.

In another embodiment, a user may click on a point in the corner of the image at the start of the application as an indication of the orientation position of the image. The process then sends the list of blocks that contain all of the criteria, such as for example, size, orientation, not connected to an edge of the image, and has at least three corners distributed in a manner that resembles a rectangular shape, and the spurious segments to the image extraction and enhancement phase 410.

Figure 5D:
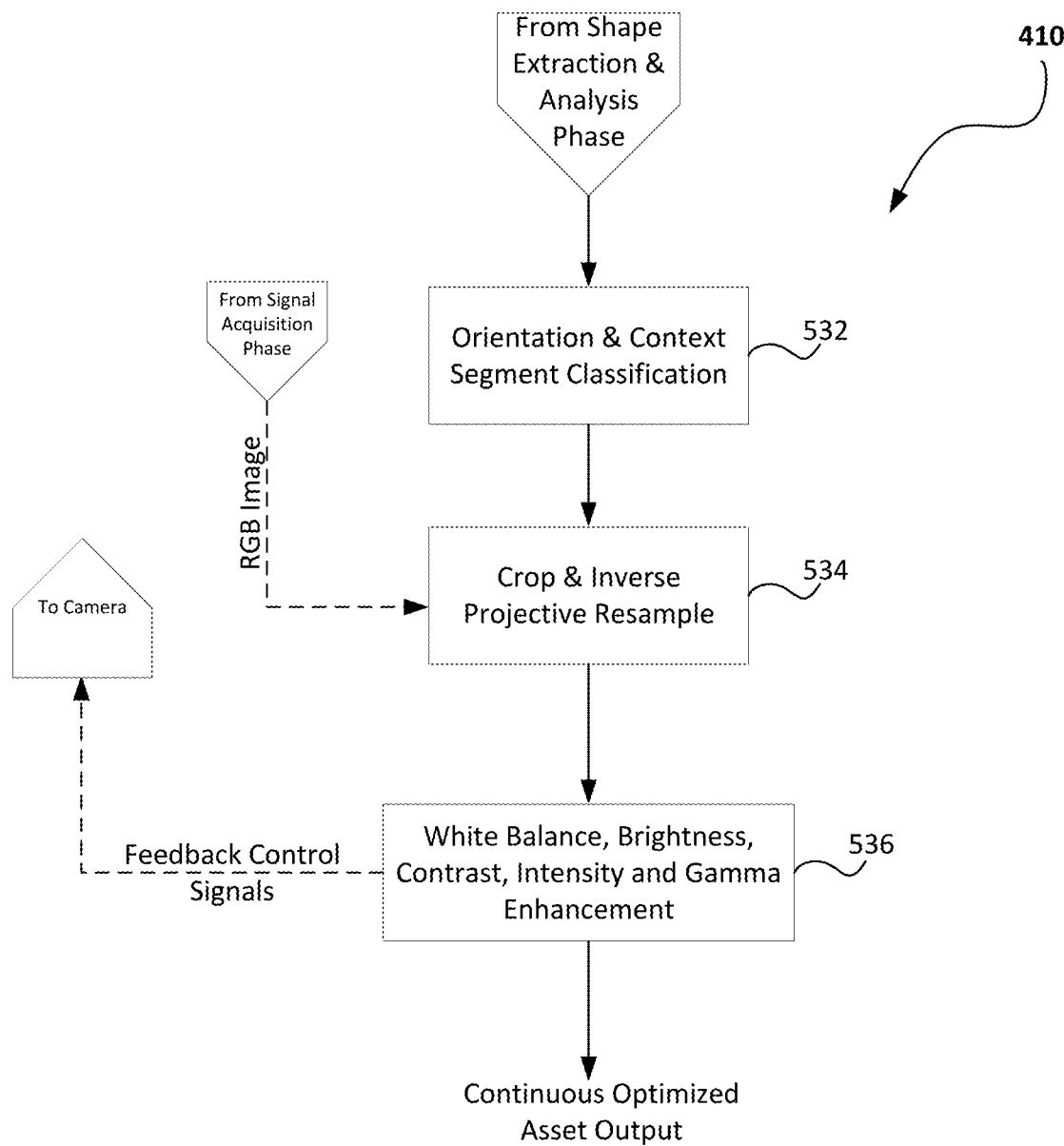
FIG. 5D is a flow diagram of an example method of an image extraction and enhancement phase according to an embodiment.
Figure 5E:
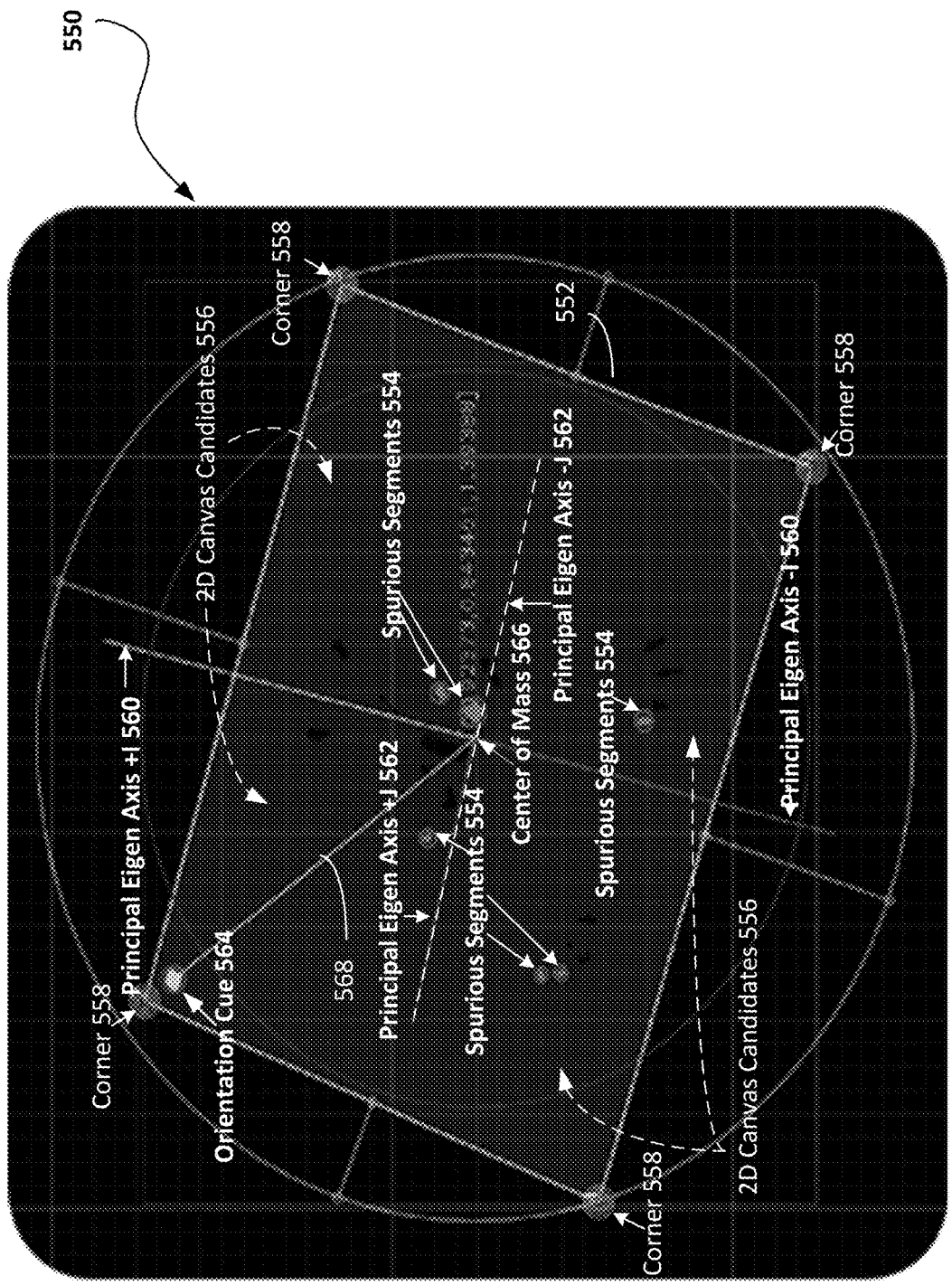
FIG. 5E is a diagram illustrating target canvas detection, segmentation and orientation detection according to an embodiment.

FIG. 5D is a flow diagram of an example method of the image extraction and enhancement phase 410 according to an embodiment. The image extraction and enhancement phase 410 begins in block 532 after receiving the lists of blocks containing the criteria (i.e., 2D canvas candidates) and the spurious segments. In block 532, orientation and context segment classification is performed by re-examining the spurious segments and the 2-D canvas candidates to verify the selected four corners of the binary block and the selected corner with the special annotation defining the orientation cue. Once the corners and the orientation cue are verified, the process then proceeds to block 534.

Having all of the geometric cues, such as, for example, knowing the 2D boundary, the four corners, the orientation cue, etc., that are needed to get back to the original image, and receiving the RGB image from the signal acquisition phase 404 along with the 2-D canvas candidates as input, the image can be reconstructed. In block 534, cropping and inverse projective resampling is performed. To optimally extract the image content, image unwrapping and interpolation are performed in a coordinated pixel-wise lasso close-form. This ensures the maximum peak signal-to-noise ratio (PSNR) without adding structural or statistical limitations to the image appearance. The process weights the signal stability from the temporal fusion of the RGB image while binding pixel color intensities to obtain a crystal-clear image. The process then proceeds to block 536.

In block 536, image quality is improved. This is accomplished using the known color of the orientation cue to ingest as a reference for determining a color correction equation (using standard statistics) to tune the remaining colors to increase or decrease the white balance, brightness, contrast, and intensity values. This process of autotuning reduces the error between the expected color signal values and the actual color signal values. The resulting numerical chromatic transformations are smoothed over time and controlled via a PID (proportional, integral, derivative) controller to provide a continuous variation of output in a closed loop feedback with the camera. In other words, the camera settings are adjusted accordingly based on the color data adjustments. This allows the next image to be captured with the best possible camera parameter settings.

Block 536 outputs a continuous stream of extracted images, ensuring 100% privacy of the surrounding context. The extracted images are sent to the network interface for sharing over networks and social media. The system classifies each frame with a confidence score in order to ensure reliability of the extraction.

Figure 6:
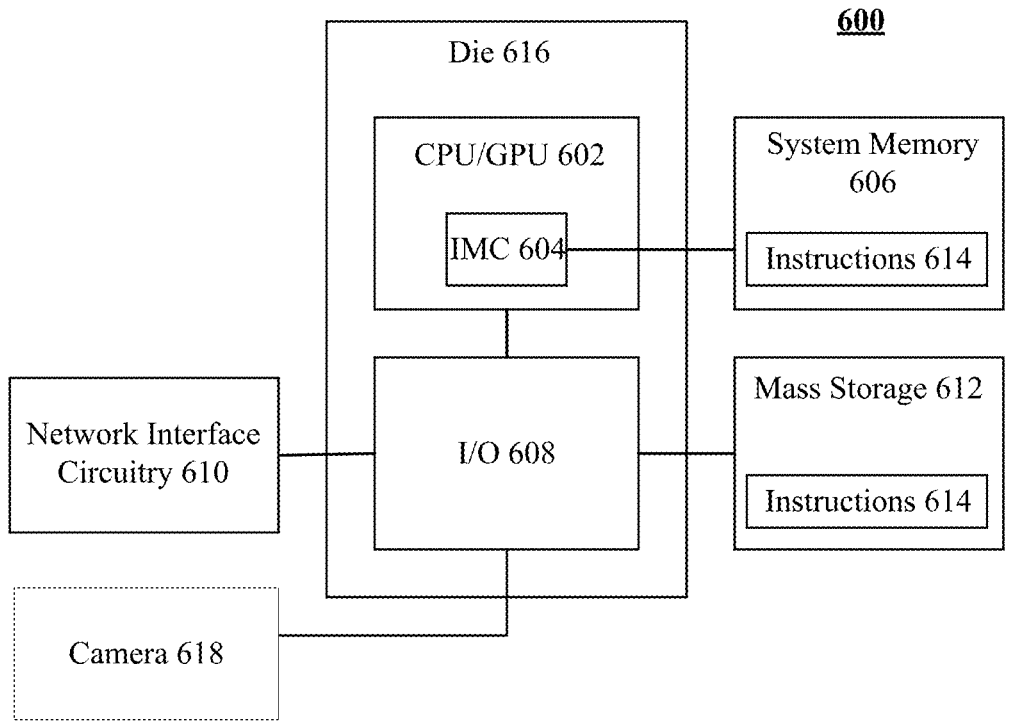
FIG. 6 is a block diagram of an example of a writing/drawing-to-digital asset extractor system according to an embodiment.

FIG. 6 is a block diagram of an example of a writing/drawing-to-digital asset extractor system according to an embodiment. The illustrated extractor system 600 includes multi-processors such as a central processing unit/CPU coupled to a graphics processing unit/GPU, shown as CPU/GPU processors 602. The CPU is the central or main processor for carrying out instructions of computer programs, such as, for example, a method to extract a user's work product from a workspace. The GPU is primarily used to render 2-D and 3-D graphics. The GPU may also be utilized to assist the CPU in non-graphics computations. The CPU/GPU 602 may include a core region with one or more processor cores (not shown).

The CPU/GPU 602 is communicatively coupled to an integrated memory controller (WIC) 604. The WIC 604 is coupled to a system memory 606 (e.g., volatile memory, dynamic random access memory/DRAM, 3D XPoint memory). The CPU/GPU 602 may also be coupled to an input/output (I/O) module 608 that communicates with network interface circuitry 610 (e.g., network controller, network interface card/NIC), mass storage 612 (non-volatile memory/NVM, hard disk drive/HDD, optical disk, solid state disk/SSD, flash memory) and a camera 618. The camera 618 may be a low cost, off-the-shelf RGB camera such as, for example, a web camera or an Intel® RealSense™ camera. The camera 618 is not limited to being a low cost, off the shelf camera. In other embodiments, the camera 618 may have a wide range of costs associated with it. The network interface circuitry 610 may receive visual content such as, for example, 2-D physical sketches, text, drawings and/or texture assets on a surface captured by camera 618 and processed by the extraction system 600 for sharing over networks and social media (shown in FIGS. 3A and 3B), wherein the system memory 606 and/or the mass storage 612 may be memory devices that store instructions 614, which when executed by the CPU/GPU 602, cause the extraction system 600 to perform one or more aspects of the methods 400, 404, 406, 408, and 410 (FIGS. 4, 5A, 5B, 5C and 5D), already discussed. Thus, execution of the instructions 614 may cause the system 600 to capture a scene, analyze the scene to extract visual content from the scene in a manner that ensures privacy of the surrounding context, and share the visual content over a network. The CPU/GPU 602 and the IO module 608 may be incorporated into a shared die 616 as a system on chip (SoC).

Figure 7:
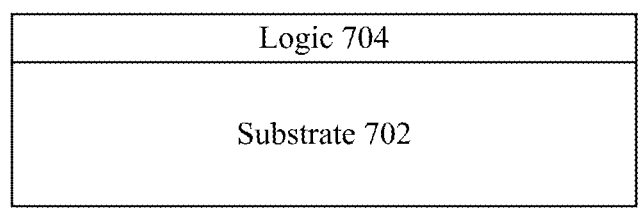
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the methods 400, 404, 406, 408, and 410 (FIGS. 4, 5A, 5B, 5C and 5D), already discussed.

Figure 8:
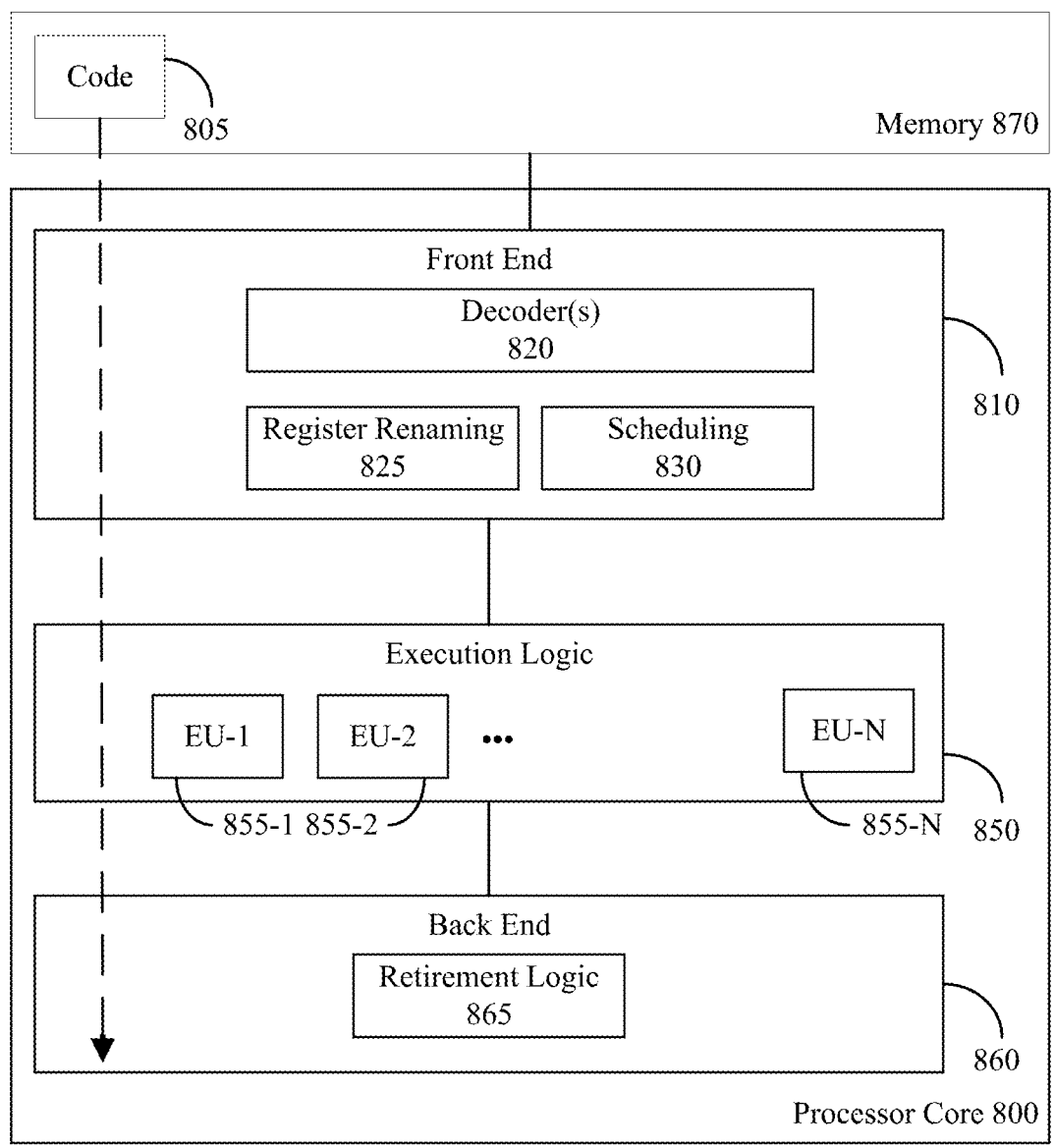
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement methods 400, 404, 406, 408, and 410 (FIGS. 4, 5A, 5B, 5C and 5D), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Figure 9:
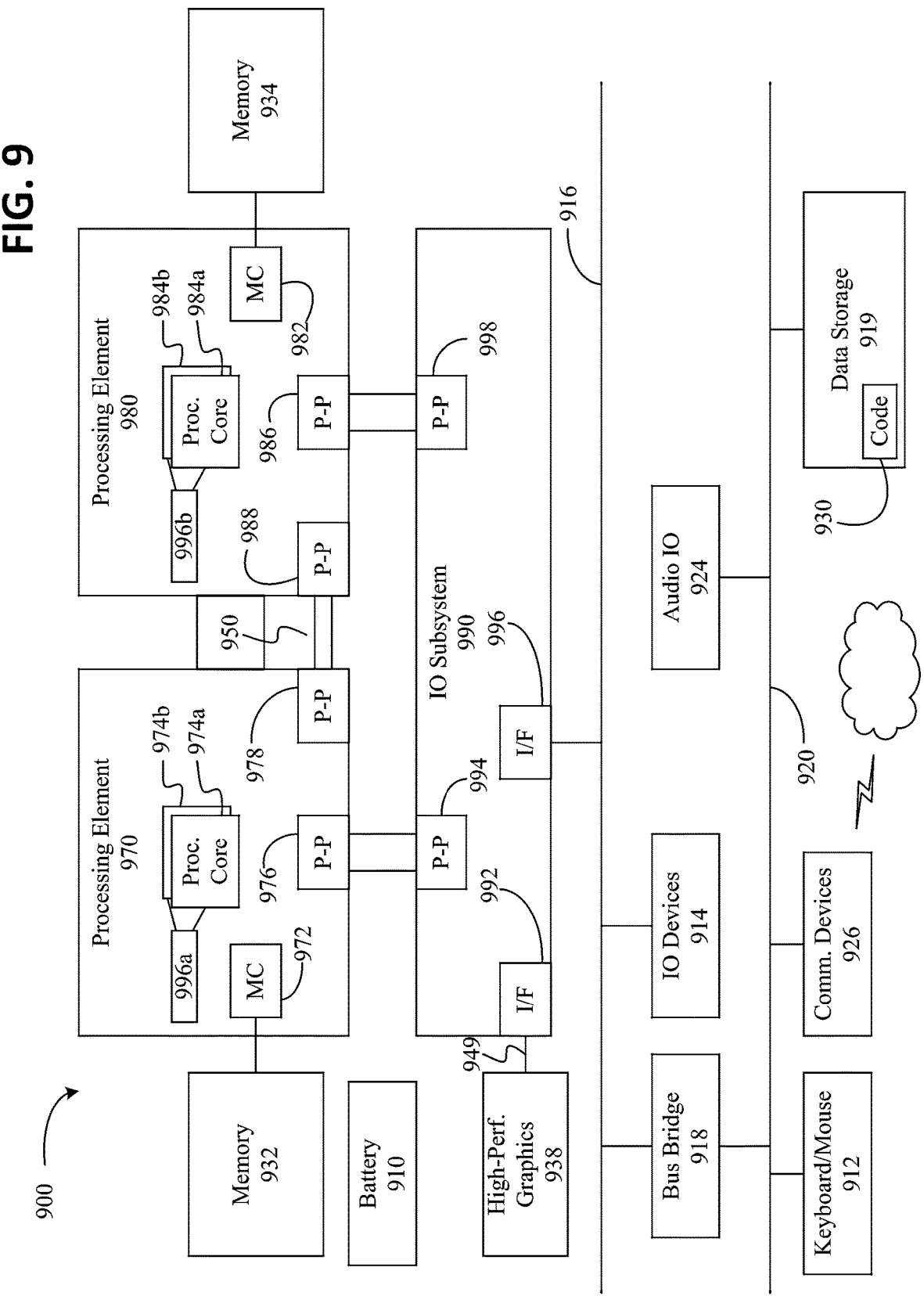
FIG. 9 is a block diagram of an exemplary computing system according to an embodiment.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974a and 974b and processor cores 984a and 984b). Such cores 974a, 974b, 984a, 984b may be configured to execute instruction code in a manner similar to that discussed above in connection with FIG. 8.

Each processing element 970, 980 may include at least one shared cache 996a, 996b. The shared cache 996a, 996b may store data (e.g., instructions) that are utilized by one or more components of the processor, such as the cores 974a, 974b and 984a, 984b, respectively. For example, the shared cache 996a, 996b may locally cache data stored in a memory 932, 934 for faster access by components of the processor. In one or more embodiments, the shared cache 996a, 996b may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the methods 400, 404, 406, 408, and 410 (FIGS. 4, 5A, 5B, 5C and 5D), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include an apparatus for extracting an asset comprising a substrate, and logic coupled to the substrate, wherein the logic includes one or more of configurable logic or fixed-functionality hardware logic, the logic coupled to the substrate to capture a scene having a two-dimensional (2D) boundary in a field of view, analyze the scene to detect visual content on the 2D boundary, and extract the visual content without capturing a visual field beyond the 2D boundary, and send the visual content over a network interface for remote sharing.

Example 2 may include the apparatus of example 1, wherein the 2D boundary comprises a rectangle.

Example 3 may include the apparatus of example 1, wherein the virtual content is used locally.

Example 4 may include the apparatus of example 1, wherein logic to capture a scene having a 2D boundary further comprises logic coupled to the substrate to capture the scene while interactively being modified.

Example 5 may include the apparatus of example 1, wherein the visual content comprises a work product of a remote student or telecommuter.

Example 6 may include the apparatus of example 1, wherein logic to capture a scene having a 2D boundary further comprises logic coupled to the substrate to automatically take, using a camera, a burst of exposures, compute mean and standard deviation per color channel in each pixel, and fuse the mean value per exposure to obtain an RGB image.

Example 7 may include the apparatus of example 6, wherein the RGB image is converted to a binary image to differentiate between a foreground and a background of the RGB image.

Example 8 may include the apparatus of example 7, wherein region growing extraction is performed on the binary image to obtain connected linked lists of pixels of the visual content while shaping eigen vector and eigen values that describe a basic rotation invariant geometric structure of the shape of the 2D boundary.

Example 9 may include the apparatus of example 8, further comprising logic coupled to the substrate to classify the connected linked lists of pixels into 2D canvas candidates and spurious segments, analyze corner saliency points of the 2D canvas candidates to determine if the shape is a quadrilateral, wherein salient corners are found in the eigen-axis distribution of the pixels for the 2D canvas candidates, and use the salient corners to determine an orientation cue, the orientation cue used to place the visual content in a correct orientation position.

Example 10 may include the apparatus of example 9, wherein the orientation cue lies between a center of mass and one of the salient corners, wherein the orientation cue is closer to the salient corner.

Example 11 may include the apparatus of example 9, further comprising logic coupled to the substrate to verify the salient corners and the orientation cue using the 2D canvas candidates and the spurious segments, extract the visual content using image unwrapping and interpolation, and enhance the visual content based on the orientation cue's color, wherein white balance, brightness, contrast and intensity values are autotuned to reduce an error between an expected signal and an acquired value.

Example 12 may include the apparatus of example 11, wherein feedback control signals based on the orientation cue's color are sent to the camera to control camera parameters to improve subsequent images captured by the camera.

Example 13 may include the apparatus of example 9, further comprising logic coupled to the substrate to classify the image with a confidence score to ensure reliability on the extraction.

Example 14 may include a method for extracting an asset, comprising capturing a scene having a two-dimensional (2D) boundary in a field of view, analyzing the scene to detect visual content on the 2D boundary, and extracting the visual content without capturing a visual field beyond the 2D boundary, and sending the visual content over a network interface for remote sharing.

Example 15 may include the method of example 14, wherein the 2D boundary comprises a rectangle.

Example 16 may include the method of example 14, wherein the virtual content is used locally.

Example 17 may include the method of example 14, wherein capturing a scene having a 2D boundary further comprises capturing the scene while interactively being modified.

Example 18 may include the method of example 14, wherein the visual content comprises a work product of a remote student or telecommuter.

Example 19 may include the method of example 14, wherein capturing a scene having a 2D boundary comprises automatically taking, using a camera, a burst of exposures, computing mean and standard deviation per color channel in each pixel, and fusing the mean value per exposure to obtain an RGB image.

Example 20 may include the method of example 19, wherein the RGB image is converted to a binary image to differentiate between a foreground and a background of the RGB image.

Example 21 may include the method of example 20, wherein region growing extraction is performed on the binary image to obtain connected linked lists of pixels of the visual content while shaping eigen vector and eigen values that describe a basic rotation invariant geometric structure of the shape of the 2D boundary.

Example 22 may include the method of example 21, further comprising classifying the connected linked lists of pixels into 2D canvas candidates and spurious segments, analyzing corner saliency points of the 2D canvas candidates to determine if the shape is a quadrilateral, wherein salient corners are found in the eigen-axis distribution of the pixels for the 2D canvas candidates, and using the salient corners to determine an orientation cue, the orientation cue used to place the visual content in a correct orientation position.

Example 23 may include the method of example 22, wherein the orientation cue lies between a center of mass and one of the salient corners, wherein the orientation cue is closer to the salient corner.

Example 24 may include the method of example 22, further comprising verifying the salient corners and the orientation cue using the 2D canvas candidates and the spurious segments, extracting the visual content using image unwrapping and interpolation, and enhancing the visual content based on the orientation cue's color, wherein white balance, brightness, contrast and intensity values are auto-tuned to reduce an error between an expected signal and an acquired value.

Example 25 may include the method of example 24, wherein feedback control signals based on the orientation cue's color are sent to the camera to control camera parameters to improve subsequent images captured by the camera.

Example 26 may include the method of example 22, further comprising classifying the image with a confidence score to ensure reliability on the extraction.

Example 27 may include at least one computer readable medium, comprising a set of instruction, which when executed by one or more computing devices, cause the one or more computing devices to capture a scene having a two-dimensional (2D) boundary in a field of view, analyze the scene to detect visual content on the 2D boundary, and extract the visual content without capturing a visual field beyond the 2D boundary, and send the visual content over a network interface for remote sharing.

Example 28 may include the at least one computer readable medium of example 27, wherein the 2D boundary comprises a rectangle.

Example 29 may include the at least one computer readable medium of example 27, wherein the virtual content is used locally.

Example 30 may include the at least one computer readable medium of example 27, wherein instructions to capture a scene having a 2D boundary further comprise instructions to capture the scene while interactively being modified.

Example 31 may include the at least one computer readable medium of example 27, wherein the visual content comprises a work product of a remote student or telecommuter.

Example 32 may include the at least one computer readable medium of example 27, wherein instructions to capture a scene having a 2D boundary further comprise instructions to automatically take, using a camera, a burst of exposures, compute mean and standard deviation per color channel in each pixel, and fuse the mean value per exposure to obtain an RGB image.

Example 33 may include the at least one computer readable medium of example 32, wherein the RGB image is converted to a binary image to differentiate between a foreground and a background of the RGB image.

Example 34 may include the at least one computer readable medium of example 33, wherein region growing extraction is performed on the binary image to obtain connected linked lists of pixels of the visual content while shaping eigen vector and eigen values that describe a basic rotation invariant geometric structure of the shape of the 2D boundary.

Example 35 may include the at least one computer readable medium of example 34, further comprising instructions, which when executed by one or more computing devices, further cause the one or more computing devices to classify the connected linked lists of pixels into 2D canvas candidates and spurious segments, analyze corner saliency points of the 2D canvas candidates to determine if the shape is a quadrilateral, wherein salient corners are found in the eigen-axis distribution of the pixels for the 2D canvas candidates, and use the salient corners to determine an orientation cue, the orientation cue used to place the visual content in a correct orientation position.

Example 36 may include the at least one computer readable medium of example 35, wherein the orientation cue lies between a center of mass and one of the salient corners, wherein the orientation cue is closer to the salient corner.

Example 37 may include the at least one computer readable medium of example 35, further comprising instructions, which when executed by one or more computing devices, further cause the one or more computing devices to verify the salient corners and the orientation cue using the 2D canvas candidates and the spurious segments, extract the visual content using image unwrapping and interpolation, and enhance the visual content based on the orientation cue's color, wherein white balance, brightness, contrast and intensity values are autotuned to reduce an error between an expected signal and an acquired value.

Example 38 may include the at least one computer readable medium of example 37, wherein feedback control signals based on the orientation cue's color are sent to the camera to control camera parameters to improve subsequent images captured by the camera.

Example 39 may include the at least one computer readable medium of example 35, further comprising instructions, which when executed by one or more computing devices, further cause the one or more computing devices to classify the image with a confidence score to ensure reliability on the extraction.

Example 40 may include a computing system for extracting an asset comprising one or more processors, a camera coupled to the one or more processors, network interface circuitry coupled to the one or more processors, and one or memory devices coupled to the one or more processors, the one or more memory devices including instructions, which when executed by the one or more processors, cause the system to capture, using the camera, a scene having a two-dimensional (2D) boundary in a field of view, analyze the scene to detect visual content on the 2D boundary, and extract the visual content without capturing a visual field beyond the 2D boundary, and send the visual content over a network interface for remote sharing.

Example 41 may include the computing system of example 40, wherein the 2D boundary comprises a rectangle.

Example 42 may include the computing system of example 40, wherein the virtual content is used locally.

Example 43 may include the computing system of example 40, wherein instructions to capture a scene having a 2D boundary further comprise instructions, which when executed by the one or more processors, cause the system to capture the scene while interactively being modified.

Example 44 may include the computing system of example 40, wherein the visual content comprises a work product of a remote student or telecommuter.

Example 45 may include the computing system of example 40, wherein instructions to capture a scene having a 2D boundary further comprise instructions, which when executed by the one or more processors, cause the system to automatically take, using the camera, a burst of exposures, compute mean and standard deviation per color channel in each pixel, and fuse the mean value per exposure to obtain an RGB image.

Example 46 may include the computing system of example 45, wherein the RGB image is converted to a binary image to differentiate between a foreground and a background of the RGB image.

Example 47 may include the computing system of example 46, wherein region growing extraction is performed on the binary image to obtain connected linked lists of pixels of the visual content while shaping eigen vector and eigen values that describe a basic rotation invariant geometric structure of the shape of the 2D boundary.

Example 48 may include the computing system of example 47, further comprising instructions, which when executed by the one or more processors, cause the system to classify the connected linked lists of pixels into 2D canvas candidates and spurious segments, analyze corner saliency points of the 2D canvas candidates to determine if the shape is a quadrilateral, wherein salient corners are found in the eigen-axis distribution of the pixels for the 2D canvas candidates, and use the salient corners to determine an orientation cue, the orientation cue used to place the visual content in a correct orientation position.

Example 49 may include the computing system of example 48, wherein the orientation cue lies between a center of mass and one of the salient corners, wherein the orientation cue is closer to the salient corner.

Example 50 may include the computing system of example 48, further comprising instructions, which when executed by the one or more processors, cause the system to verify the salient corners and the orientation cue using the 2D canvas candidates and the spurious segments, extract the visual content using image unwrapping and interpolation, and enhance the visual content based on the orientation cue's color, wherein white balance, brightness, contrast and intensity values are autotuned to reduce an error between an expected signal and an acquired value.

Example 51 may include the computing system 50, wherein feedback control signals based on the orientation cue's color are sent to the camera to control camera parameters to improve subsequent images captured by the camera.

Example 52 may include the computing system of example 48, further comprising instructions, which when executed by the one or more processors, cause the system to classify the image with a confidence score to ensure reliability on the extraction.

Example 53 may include an apparatus for extracting an asset comprising means for capturing a scene having a two-dimensional (2D) boundary in a field of view, means for analyzing the scene to detect visual content on the 2D boundary, and means for extracting the visual content without capturing a visual field beyond the 2D boundary, and means for sending the visual content over a network interface for remote sharing.

Example 54 may include the apparatus of example 53, wherein the 2D boundary comprises a rectangle.

Example 55 may include the apparatus of example 53, wherein the virtual content is used locally.

Example 56 may include the apparatus of example 53, wherein means for capturing a scene having a 2D boundary further comprises means for capturing the scene while interactively being modified.

Example 57 may include the apparatus of example 53, wherein the visual content comprises a work product of a remote student or telecommuter.

Example 58 may include the apparatus of example 53, wherein means for capturing a scene having a 2D boundary comprises means for automatically taking, using a camera, a burst of exposures, means for computing mean and standard deviation per color channel in each pixel, and means for fusing the mean value per exposure to obtain an RGB image.

Example 59 may include the apparatus of example 58, wherein the RGB image is converted to a binary image to differentiate between a foreground and a background of the RGB image.

Example 60 may include the apparatus of example 59, wherein region growing extraction is performed on the binary image to obtain connected linked lists of pixels of the visual content while shaping eigen vector and eigen values that describe a basic rotation invariant geometric structure of the shape of the 2D boundary.

Example 61 may include the apparatus of example 60, further comprising means for classifying the connected linked lists of pixels into 2D canvas candidates and spurious segments, means for analyzing corner saliency points of the 2D canvas candidates to determine if the shape is a quadrilateral, wherein salient corners are found in the eigen-axis distribution of the pixels for the 2D canvas candidates, and means for using the salient corners to determine an orientation cue, the orientation cue used to place the visual content in a correct orientation position.

Example 62 may include the apparatus of example 61, wherein the orientation cue lies between a center of mass and one of the salient corners, wherein the orientation cue is closer to the salient corner.

Example 63 may include the apparatus of example 61, further comprising means for verifying the salient corners and the orientation cue using the 2D canvas candidates and the spurious segments, means for extracting the visual content using image unwrapping and interpolation, and means for enhancing the visual content based on the orientation cue's color, wherein white balance, brightness, contrast and intensity values are autotuned to reduce an error between an expected signal and an acquired value.

Example 64 may include the apparatus of example 63, wherein feedback control signals based on the orientation cue's color are sent to the camera to control camera parameters to improve subsequent images captured by the camera.

Example 65 may include the apparatus of example 61, further comprising means for classifying the image with a confidence score to ensure reliability on the extraction.

Example 66 may include at least one computer readable medium comprising a set of instructions, which when executed by a computing system, cause the computing system to perform the method of any one of examples 14 to 26.

Example 67 may include an apparatus comprising means for performing the method of any one of examples 14 to 26.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus to extract an asset, the apparatus comprising:
    a substrate; and
    logic coupled to the substrate, wherein the logic includes one or more of configurable logic or fixed-functionality hardware logic, the logic coupled to the substrate to:
        capture a scene having a two-dimensional (2D) boundary in a field of view comprising logic coupled to the substrate to:
            automatically take, using a camera, a burst of exposures;
            compute mean and standard deviation per color channel in each pixel; and
            fuse the mean value per exposure to obtain an RGB image, wherein the RGB image is converted to a binary image to differentiate between a foreground and a background of the RGB image, wherein region growing extraction is performed on the binary image to obtain connected linked lists of pixels of the visual content while shaping eigen vector and eigen values that describe a basic rotation invariant geometric structure of the shape of the 2D boundary, wherein the scene includes a work product located on a workspace;
        analyze the scene to detect visual content on the 2D boundary;
        extract and enhance the visual content without capturing a visual field beyond the 2D boundary, wherein any content not fully contained within the 2D boundary is removed to preserve user privacy;
        send the visual content over a network interface to showcase the visual content for interactive remote collaboration;
        classify the connected linked lists of pixels into 2D canvas candidates and spurious segments;
        analyze corner saliency points of the 2D canvas candidates to determine if the shape is a quadrilateral, wherein salient corners are found in the eigen-axis distribution of the pixels for the 2D canvas candidates; and
        use the salient corners to determine an orientation cue, the orientation cue used to place the visual content in a correct orientation position, wherein the orientation queue indicates an upper left corner of the visual content.

2. The apparatus of claim 1, wherein the orientation cue lies between a center of mass and one of the salient corners, wherein the orientation cue is closer to the salient corner.

3. The apparatus of claim 1, further comprising logic coupled to the substrate to:
    verify the salient corners and the orientation cue using the 2D canvas candidates and the spurious segments;
    extract the visual content using image unwrapping and interpolation; and
    enhance the visual content based on the orientation cue's color, wherein brightness, contrast and intensity values are autotuned to reduce an error between an expected signal and an acquired value.

4. The apparatus of claim 3, wherein feedback control signals based on the orientation cue's color are sent to the camera to control camera parameters to improve subsequent images captured by the camera.

5. The apparatus of claim 1, further comprising logic coupled to the substrate to:
    classify the visual content with a confidence score to ensure reliability of the extracted visual content.

6. A method for extracting an asset, comprising:
    capturing a scene having a two-dimensional (2D) boundary in a field of view comprising:
        automatically taking, using a camera, a burst of exposures;
        computing mean and standard deviation per color channel in each pixel; and
        fusing the mean value per exposure to obtain an RGB image, wherein the RGB image is converted to a binary image to differentiate between a foreground and a background of the RGB image, wherein region growing extraction is performed on the binary image to obtain connected linked lists of pixels of the visual content while shaping eigen vector and eigen values that describe a basic rotation invariant geometric structure of the shape of the 2D boundary, wherein the scene includes a work product located on a workspace;
    analyzing the scene to detect visual content on the 2D boundary;
    extracting and enhancing the visual content without capturing a visual field beyond the 2D boundary, wherein any content not fully contained within the 2D boundary is removed to preserve user privacy;

sending the visual content over a network interface to showcase the visual content for interactive remote collaboration;

classifying the connected linked lists of pixels into 2D canvas candidates and spurious segments;

analyzing corner saliency points of the 2D canvas candidates to determine if the shape is a quadrilateral, wherein salient corners are found in the eigen-axis distribution of the pixels for the 2D canvas candidates; and using the salient corners to determine an orientation cue, the orientation cue used to place the visual content in a correct orientation position, wherein the orientation queue indicates an upper left corner of the visual content.

7. The method of claim 6, wherein the orientation cue lies between a center of mass and one of the salient corners, wherein the orientation cue is closer to the salient corner.

8. The method of claim 6, further comprising:

verifying the salient corners and the orientation cue using the 2D canvas candidates and the spurious segments;

extracting the visual content using image unwrapping and interpolation; and enhancing the visual content based on the orientation cue's color, wherein brightness, contrast and intensity values are autotuned to reduce an error between an expected signal and an acquired value.

9. The method of claim 8, wherein feedback control signals based on the orientation cue's color are sent to the camera to control camera parameters to improve subsequent images captured by the camera.

10. The method of claim 6, further comprising classifying the visual content with a confidence score to ensure reliability of the extracted visual content.

11. At least one non-transitory computer readable medium, comprising a set of instruction, which when executed by one or more computing devices, cause the one or more computing devices to:

capture a scene having a two-dimensional (2D) boundary in a field of view comprising instructions to:

automatically take, using a camera, a burst of exposures;

compute mean and standard deviation per color channel in each pixel; and fuse the mean value per exposure to obtain an RGB image, wherein the RGB image is converted to a binary image to differentiate between a foreground and a background of the RGB image, wherein region growing extraction is performed on the binary image to obtain connected linked lists of pixels of the visual content while shaping eigen vector and eigen values that describe a basic rotation invariant geometric structure of the shape of the 2D boundary, wherein the scene includes a work product located on a workspace;

analyze the scene to detect visual content on the 2D boundary;

extract and enhance the visual content without capturing a visual field beyond the 2D boundary, wherein any content not fully contained within the 2D boundary is removed to preserve user privacy;

send the visual content over a network interface to showcase the visual content for interactive remote collaboration;

classify the connected linked lists of pixels into 2D canvas candidates and spurious segments;

analyze corner saliency points of the 2D canvas candidates to determine if the shape is a quadrilateral, wherein salient corners are found in the eigen-axis distribution of the pixels for the 2D canvas candidates; and use the salient corners to determine an orientation cue, the orientation cue used to place the visual content in a correct orientation position, wherein the orientation queue indicates an upper left corner of the visual content.

12. The at least one non-transitory computer readable medium of claim 11, wherein the orientation cue lies between a center of mass and one of the salient corners, wherein the orientation cue is closer to the salient corner.

13. The at least one non-transitory computer readable medium of claim 11, further comprising instructions, which when executed by one or more computing devices, further cause the one or more computing devices to:

verify the salient corners and the orientation cue using the 2D canvas candidates and the spurious segments;

extract the visual content using image unwrapping and interpolation; and enhance the visual content based on the orientation cue's color, wherein brightness, contrast and intensity values are autotuned to reduce an error between an expected signal and an acquired value.

* * * * *